April 25, 1933. S. D. LOCKE ET AL 1,905,179
LUBRICATING APPARATUS
Filed June 13, 1922 3 Sheets-Sheet 1
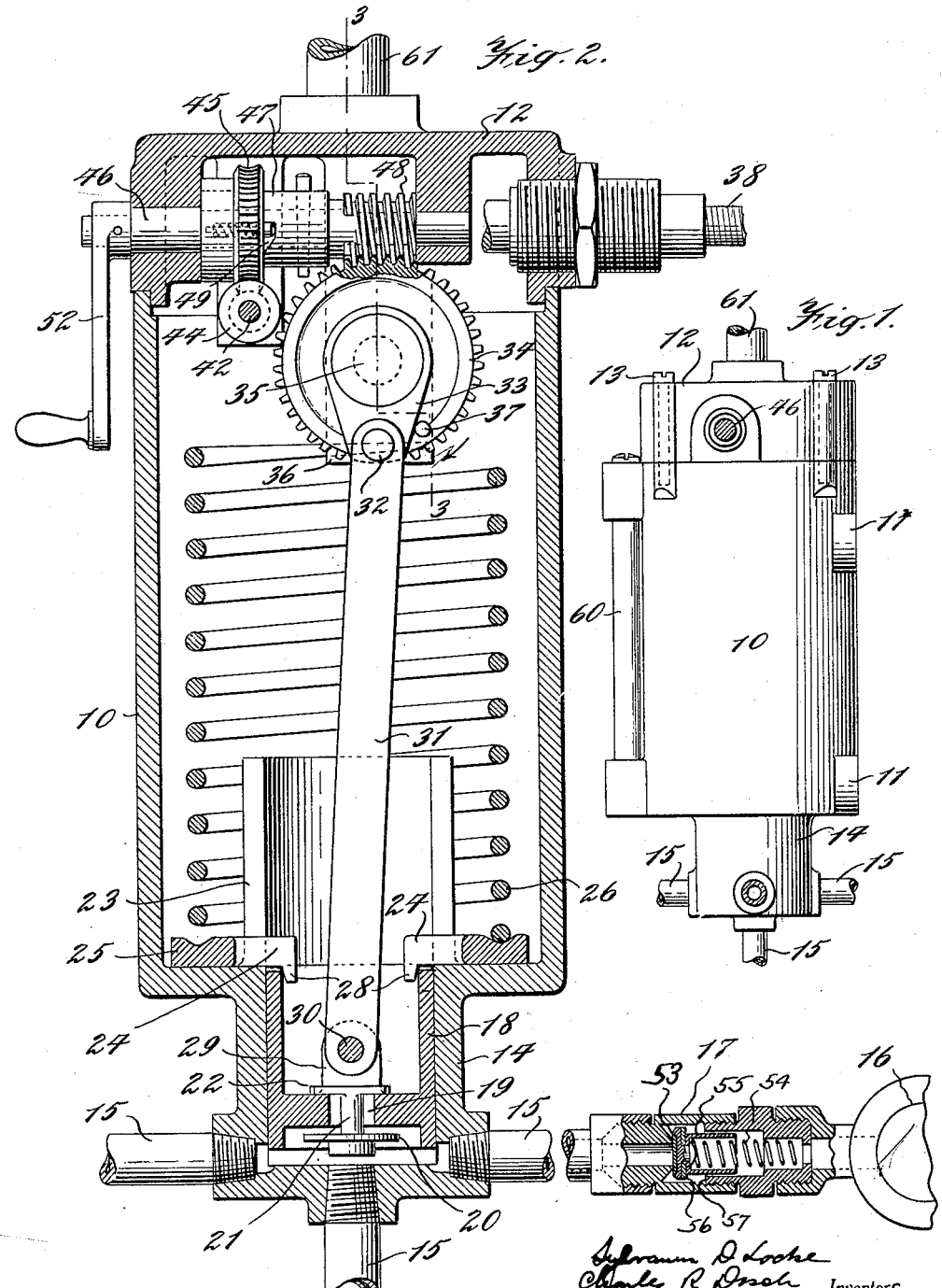

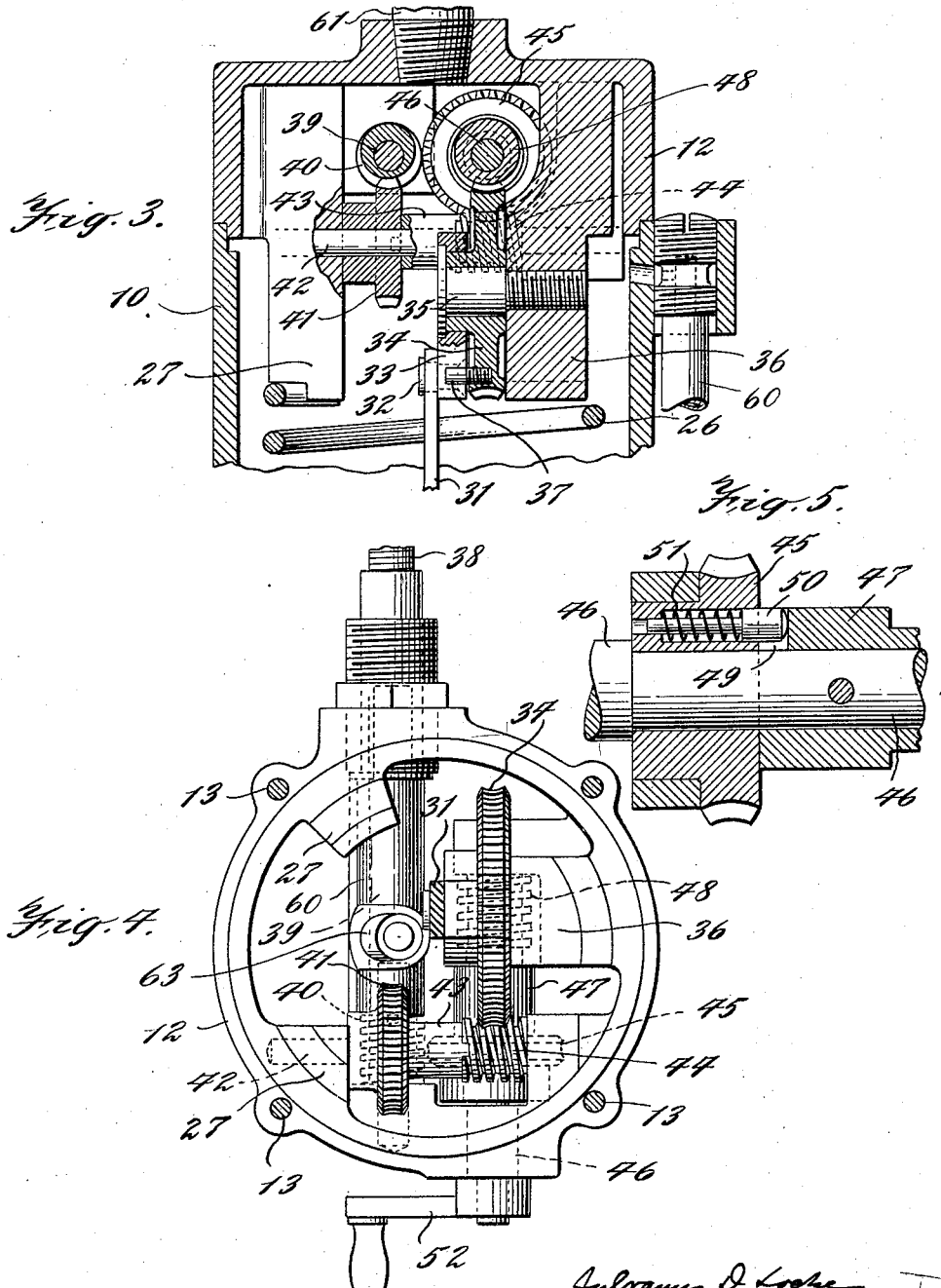

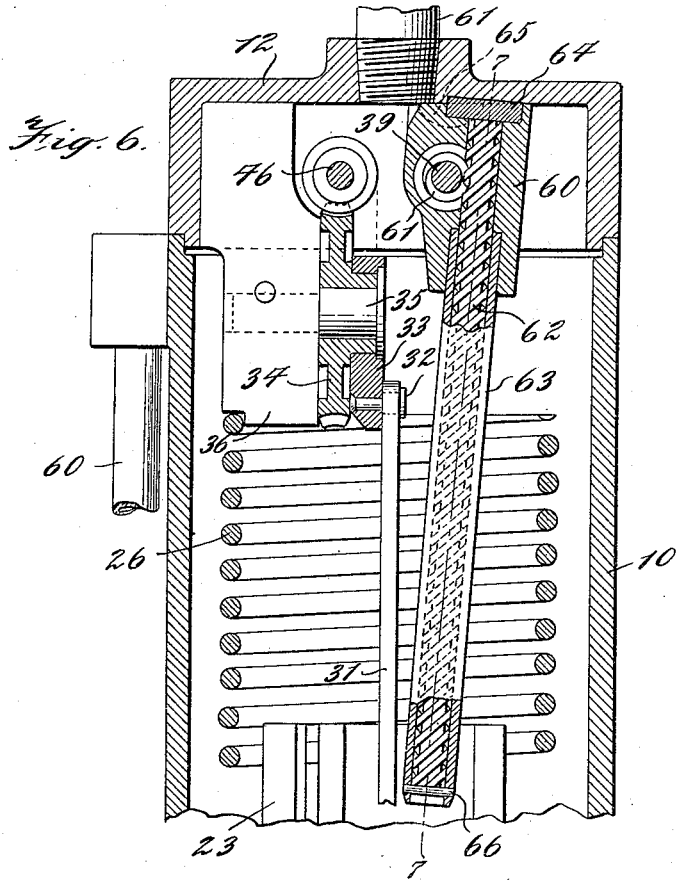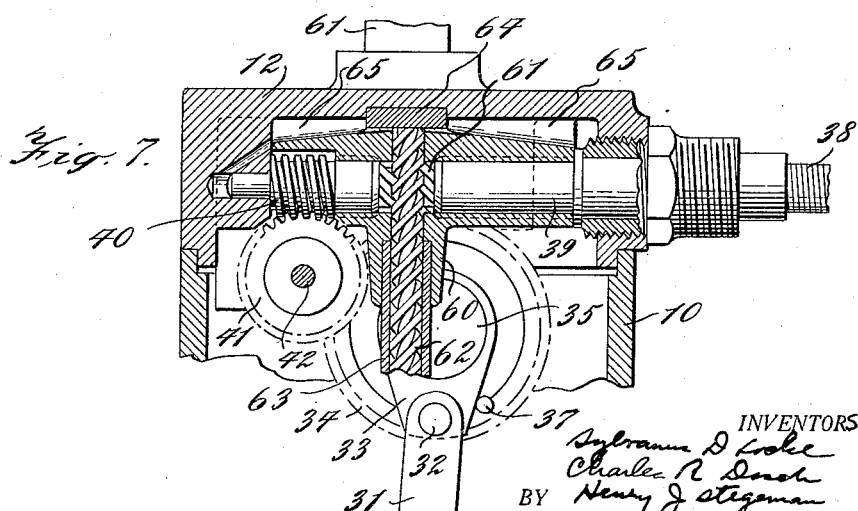

Patented Apr. 25, 1933

1,905,179

UNITED STATES PATENT OFFICE

SYLVANUS D. LOCKE, OF BRIDGEPORT, CHARLES R. DOSCH, OF STRATFORD, AND HENRY J. STEGEMAN, OF FAIRFIELD, CONNECTICUT, ASSIGNORS, BY MESNE ASSIGNMENTS, TO ALEMITE CORPORATION, OF CHICAGO, ILLINOIS, A CORPORATION OF DELAWARE

LUBRICATING APPARATUS

Application filed June 13, 1922. Serial No. 567,906.

Our present invention relates to a lubricating apparatus for mechanism, and relates particularly to the type of apparatus disclosed in the copending application of Sylvanus D. Locke and Charles R. Dosch, Serial No. 540,000, filed February 28, 1922.

In the form of apparatus referred to, the lubricant is carried from the reservoir to the bearing to be lubricated, through suitable conduits or tubes, and the bearing is supplied with a quantity of lubricant intermittently by changes of pressure on the lubricant in the conduit from time to time.

One of the objects of our present invention is to simplify and make more effective the pressure-applying mechanism of such a system. Another object of our invention is to provide a source of lubricant which may be independent of the lubricant used on other parts of the machine, both as to quality and the pressure applied thereto, and yet which may be operated by the machine so as to lubricate the bearing at predetermined intervals during the operation of the machine.

With these and other objects in view, our invention consists in the combinations and arrangements hereinafter set forth and more specifically pointed out in the appended claims.

In the drawings, which illustrate one form of our invention as it may be applied to the lubrication of the bearings of a motor vehicle, Figure 1 is an external view of a pressure-applying apparatus in our illustrative embodiment; Fig. 2 is an enlarged vertical section of the apparatus shown in Fig. 1, showing also a bearing to which lubricant may be supplied therefrom and a measuring device or meter between the pressure-applying apparatus and the bearing; Fig. 3 is a partial section on the line 3—3 of Fig. 2; Fig. 4 is a bottom view of the cover and the apparatus connected thereto shown in Fig. 3; Fig. 5 is an enlarged detail; Fig. 6 is a partial section similar to Fig. 3, looking from the opposite direction, and Fig. 7 is a section similar to Fig. 2, but taken on the line 7—7 of Fig. 6, with some of the parts broken away.

Like reference characters indicate like parts in the several views.

The lubricant reservoir 10, which, in the form illustrated, is cylindrical in outline, may be provided with ears 11 by which it may be fastened against a suitable support. On the reservoir 10 is a cover or cap 12, held in place by the screws 13. In the bottom of the reservoir 10 is formed a cylinder 14, to the lower end of which is connected a number of conduits or pipes 15, each leading to one or more bearings, one of which is illustrated as at 16. Adjacent each of the bearings is provided a measuring device or meter, one of which is shown in Fig. 2, to control the flow of fluid from the conduit to the bearing, such a meter being represented generally at 17 and being similar to one of the forms of apparatus illustrated in the said copending application.

In the cylinder 14 is a plunger 18 having an opening 19 in the lower end thereof, provided with a valve 20 having a stem 21 and a stop piece 22, this stop piece being only a narrow strip extending across the opening 19 and having space on either side thereof to permit lubricant to flow from the reservoir 10 through the opening 19. The walls of the cylinder 14 are continued up inside of the reservoir 10 to form semi-cylindrical guide pieces 23 for the plunger 18. Projecting between these semi-cylindrical guide pieces 23 are arms 24 of a circular member 25, against which bears a spiral spring 26, the upper end of which bears against lugs 27 and 36 depending from the cap 12, these lugs having grooves to retain the end of the spring. The arms 24 are provided with downwardly-turned portions 28 extending inside of the plunger 18, and the arms 24 rest on the upper end of the plunger 18. When the plunger 18 is raised, the arms 24, and therefore the circular member 25, are also raised against the pressure of the spring 26, the plunger 18 being guided by the semi-cylindrical members 23 as it passes out of the cylinder 14. Similarly, the plunger 18 is moved downward by the pressure of the spring 26 through the circular member 25 and the arms 24.

The plunger 18 is provided with a pair of lugs 29, through which extends a pin 30, to which is pivotally connected a pitman 31, the upper end of which is pivotally connected to a crank pin 32 on a crank arm 33, freely rotatable on the hub of a worm wheel 34, which, in turn, is freely rotatable on a stud 35 supported on the lug 36. The worm wheel 34 is provided with a driving pin 37 projecting across the plane of the crank arm 33.

The worm wheel 34 is rotated by power applied from some outside source, which, in the form illustrated, may be a flexible shaft connected to some driving part of the vehicle, preferably a part which moves only when the vehicle is in motion. Such a flexible shaft 38 is connected in the usual manner to a first shaft 39, provided with a worm 40 engaging a worm wheel 41. The worm wheel 41 rotates freely on a fixed shaft 42 and transmits motion through a clutch collar 43 to a worm 44. The worm 44 engages a worm wheel 45, which is free to rotate on a shaft 46, and to this shaft 46 is pinned a clutch collar 47 having a driving connection with a worm 48, the worm 48 engaging with the worm wheel 34. The clutch collar 47 has a recess 49 formed in one end and shaped as shown best in Fig. 2, with one flat side and one angular side. Located so as to be capable of dropping into the recess 49 is a driving pin 50, mounted in the worm wheel 45 and normally held outward by a spring 51, as best shown in Fig. 5. The shaft 46 is extended through the cap 12 and is provided on its outer end with a handle 52 connected to the shaft 46.

When the flexible shaft 38 is turned, the shaft 39 is rotated to turn the worm 40, which, in turn, rotates the worm 44 and the worm wheel 45. The rotation of the worm wheel 45 is in such a direction that the pin 50 engages with the flat side of the recess 49 to turn the clutch collar 47, and therefore the worm 48, which, in turn, rotates the worm wheel 34 in the direction of the arrow in Fig. 2. This causes the driving pin 37 to contact with the side of the crank 33 to turn the latter and to carry the crank pin 32 clockwise. With the parts in the position shown in Fig. 2, this will raise the plunger 18 aganst the pressure of the spring 26, and during the upward motion, the valve 20 remains in the position shown in Fig. 2, so that lubricant from the reservoir 10 will flow down through the plunger and through the opening 19 into the lower part of the cylinder 14. When the crank pin 32 is turned through approximately 180° and has passed over the center at the top, the spring 26 will carry the crank arm 33 away from the driving pin 37 and force the plunger 18 downward, so that no matter how slowly the worm wheel 34, and therefore the driving pin 37, may be turning, the application of pressure to the fluid in the cylinder 14 will be relatively sudden. As the plunger 18 is carried downward, the valve 20 will close against its seat and the fluid beneath the plunger 18 will be subjected to pressure and will be forced into the several pipes 15.

It will be noted that when the crank 33 is in its lowest position, as shown in Fig. 2, the member 25 is resting on the bottom of the reservoir 10 and there is a clearance between the arms 24 and the upper part of the plunger 18. We prefer this arrangement because it provides an efficient stop to take up the shock in case the device is operated with no lubricant in it. Under such circumstances, if the suddenly released spring could exert its force directly on the pins 30 and 32, breakage might ensue if the force of the spring acted on the plunger 18 for its complete stroke. By providing the clearance described, it will be obvious that the expansion of the spring is stopped and the pins 30 and 32 relieved of their pressure before they complete their downstroke.

The member 25, with its arms 24, enable us to provide a spring of large diameter operating on a relatively small diameter plunger. With such an arrangement, it is obvious that the diameter of the spring is limited only by the diameter of the reservoir and is entirely independent of the diameter of the pump cylinder.

As has been explained in the said copending application, the application of pressure on the fluid in the pipes 15 will open the valve 53 of the meter 17 to overcome the pressure of the spring 54, and as soon as the valve 53 leaves its seat, the increased area subject to pressure from the pipes 15 will cause the valve body 55 to move rapidly to the right of Fig. 2 until the second valve 56 is seated against the seat 57. No matter how long the plunger 18 takes to move downward, therefore, no lubricant will flow from the pipes 15 to the bearing 16 so long as the pressure on the lubricant is maintained.

Since, in the ordinary use of our apparatus, as, for instance, on motor vehicles, the bearings are to be lubricated only at long intervals, it will be seen that the crank pin 32 will rotate very slowly. In fact, the series of worm and worm wheels which we have illustrated is provided to reduce the speed from the relatively rapidly turning shaft 38 so that the plunger 18 will be reciprocated only at relatively long intervals. It is usually desirable to relieve the pressure in the pipes 15 before the driving pin 37 has completed approximately a half-turn to re-engage the crank arm 33 and to turn it so as to raise the plunger 18, while, at the same time, it is desirable to maintain the pressure for a relatively long time, to enable the pressure to be transmitted to the meters 17 adjacent the bearings to be lubricated, no matter how far such bearings may be from the pressure-producing device nor how viscous the lubricant may be because of low temperature. By this arrangement, a certain amount of lubricant flows slowly back into the reservoir 10 around the piston 18, this flow being slow enough, however, to maintain the pressure on the lubricant for the desired length of time to enable all of the meters to be operated and yet sufficiently fast to relieve the pressure on the lubricant in the pipes 15 long before the driving pin 37 has re-engaged the crank 33. As soon as the pressure in the pipes 15 drops, the spring 54 will move the valve 56 away from the seat 57 and, by reason of the decreased effective area subjected to fluid pressure as this valve leaves its seat, the valve body 55 will move rapidly to the left of Fig. 2 until it is in the position shown in Fig. 2. In the motion of the valve body which has been described, a small quantity of lubricant will have passed out of the pipes 15 into the chamber in which the valves 53 and 56 move, and when the valve body 55 is moving back to the position shown in Fig. 2, this small quantity of lubricant will pass out around the valve body 55 into position to flow to the bearing 16 by gravity or to be forced to the bearing at the next operation of the measuring device.

When the driving pin 37 re-engages the crank arm 33, it will rotate the latter to again raise the plunger 18 slowly until the top of the stroke is reached, when it is again suddenly released and moved down by the pressure of the spring 26.

If it is desired to cause the valve 17 to operate independently of the driving shaft 38, the handle 52 may be turned manually in the same direction in which the shaft 46 is rotated by the shaft 38, when the sloping side of the recess 49 will push the pin 50 inward and permit the worm 48, and therefore the worm wheel 34, to be turned without moving any of the other worms or worm wheels of the train, so that the plunger 18 may be reciprocated without driving through the several worms and worm wheels.

It will be seen that the arrangement which we have provided is both a pressure-producing arrangement or pump and a timing device combined, which will apply pressure suddenly to the lubricant in the pipes 15 at long intervals and yet in such a manner that the pressure is applied and relieved in a relatively short time, so that the measuring valve will have a complete operation represented by a stroke in each direction of the valves 53 and 56 occupying only a small portion of a very long cycle.

By mounting all of the driving mechanism on the cover 12, we insure that there shall be no leakage of lubricant around the shafts which project through the walls to drive the pump from some outside source, the level of the lubricant being kept below the joint between the cover 12 and the body of the reservoir 10. A gauge-glass 60 may be provided at the side of the reservoir 10 to guide the user as to the amount of lubricant in the reservoir, which may be filled from time to time through the pipe 61.

As best shown in Figs. 6 and 7, we provide a lubricating device for the operating mechanism of the pump. A sleeve 60 is mounted loosely on the shaft 39 and held against rotation by a shoulder contacting with the under side of the cover 12. A spiral gear 61 is formed on shaft 39, this gear engaging a spiral gear 62 mounted in the sleeve 60. Gear 62 is extended as a long screw through the tube 63, the lower end of the tube and gear 62 extending below the level of the lubricant in reservoir 10. Tube 63 is fastened in the sleeve 60. A thrust piece 64 at the end of the gear 62 takes the thrust of the gear. Oil channels 65, 65 lead from the upper end of gear 62 to the bearings at either end of shaft 39.

A pin 66 serves to hold the gear 62 in the tube 63. As shaft 39 turns, gear 62 is also rotated by the gear 61 and the threads on gear 62 act as a pump to lift the lubricant to the top of the gear 62, from which it flows through the channels 65, 65 to the bearings of shaft 39, so as to flood them with lubricant. In practice, sufficient lubricant finds its way to the bearings of the other shafts, which run relatively slowly. If desired, ducts may be provided from channels 65 directly connecting the other bearings.

While we have shown the pump cylinder 14 as a part of the oil reservoir, it is obvious that this is not essential. As a means for relieving the pressure in the pump cylinder before the plunger 18 is moved upward, the clearance between the plunger 18 and the walls of the cylinder 14, hereinbefore described, is relatively simple, but it will be understood that the same end may be accomplished by providing a by-pass from the lower end of the cylinder 14 to the reservoir 10. Similarly, the valve arrangement in the bottom of the plunger by which the lubricant is permitted to pass beneath the plunger on its up-stroke and is prevented from passing on its down-stroke, may be varied within wide limits.

We claim:

1. In a bearing lubricating system, a lubricant reservoir, a pipe leading therefrom to the bearing to be lubricated, a measuring mechanism in the pipe arranged to be operated by changes of pressure on the lubricant in the pipe to supply a quantity of lubricant to the bearing for each change of pressure, and a pump to produce pressure on the lubricant comprising a cylinder, a plunger therein, and means to reciprocate the plunger positively on its nonpressure stroke and under yielding pressure on its pressure stroke, the cubic contents of the cylinder which the plunger displaces in its pressure stroke being greatly in excess of the quantity of lubricant supplied by said measuring mechanism for each change of pressure, and said pump having provision to relieve the presure in the cylinder before the non-pressure stroke begins, irrespective of the amount of lubricant passing into the delivery pipe.

2. In a lubricating system, a conduit system leading to bearings to be lubricated, metering means in said conduit system for determining the quantities of lubricant supplied to said bearings, a cylinder connected to said conduit system, a reciprocable plunger therein, a spring to move the plunger on its pressure stroke, and means to move the plunger positively on its non-pressure stroke and to release it at the end of such stroke, said cylinder having provision automatically to relieve the pressure therein before the non-pressure stroke begins irrespective of the amount of lubricant passing into the conduit system.

3. In a lubricating system, a lubricant-pressure-producing mechanism comprising a cylinder, a delivery pipe connected thereto, a reciprocable plunger therein, a crank to move the plunger, a driving shaft, a series of worm and worm-wheel reducing gears between the crank and the driving shaft, a clutch between the last two worms and worm wheels of the series adjacent the crank, and manually operable means to rotate the last worm, whereby the crank may be rotated manually without turning the series of worms and worm wheels.

4. In a lubricating system, a lubricant reservoir, a cylinder in the base thereof, a delivery outlet in the end of the cylinder, a reciprocable plunger in said cylinder, power operated means to move the plunger positively away from the end of the cylinder, means to move the plunger under yielding pressure toward the end of the cylinder, and a valve in the plunger arranged to be closed by the pressure of the lubricant in the cylinder on the pressure stroke and to open on the non-pressure stroke.

5. In a lubricating system, a lubricant reservoir, a cylinder in the base thereof, a delivery outlet in the end of the cylinder, a reciprocable plunger in said cylinder, means to move the plunger positively away from the end of the cylinder, means to move the plunger under yielding pressure toward the end of the cylinder, and a valve in the plunger arranged to be closed by the pressure of the lubricant in the cylinder on the pressure stroke and to open on the non-pressure stroke, the plunger having sufficient clearance between it and the cylinder to permit lubricant to flow slowly from one end of the plunger to the other, whereby the pressure in the cylinder may be relieved before the plunger moves on its non-pressure stroke.

6. In a lubricating system, a lubricant reservoir, a cylinder in the base thereof, a reciprocable plunger in said cylinder, a delivery pipe connected to said cylinder, mechanism, having at least a portion thereof in the upper part of the reservoir, to reciprocate said plunger, and means to draw lubricant from the reservoir and supply it to the upper portion of said mechanism.

7. In a lubricating system, a lubricant reservoir, a cylinder in the base thereof, a reciprocable plunger in said cylinder, a delivery pipe connected to said cylinder, mechanism including a driving shaft for reciprocating said plunger, at least a portion of said mechanism being in the upper part of said reservoir, and lubricating means for said mechanism arranged to be driven by said driving shaft and to draw lubricant from said reservoir.

8. In a lubricating system, a lubricant reservoir, a cylinder in the base thereof, a reciprocable plunger in said cylinder, a delivery pipe connected to said cylinder, mechanism, having at least a portion thereof in the upper part of the reservoir, to reciprocate said plunger, means to draw lubricant from the reservoir and supply it to the upper part of said mechanism, said means comprising a threaded member extending into the lubricant in the reservoir and arranged to be rotated by said driving shaft, and a tube surrounding said threaded member.

9. A pressure-producing mechanism for a lubricating system, comprising a cylinder, a delivery pipe connected thereto, a reciprocable plunger therein, means to move the plunger positively on its non-pressure stroke and to release it at the end of such stroke, and means to move the plunger yieldingly on its pressure stroke, said last-named means including a movable member, a spring to move the movable member, connections between the movable member and the plunger to transmit the pressure of the spring to the plunger, and a fixed stop to limit the movement of said movable member with the plunger before the plunger has completed its pressure stroke.

10. A pressure-producing mechanism for a lubricating system, comprising a cylinder, a delivery pipe connected thereto, a reciprocable plunger therein, means to move the plunger positively on its non-pressure stroke and to release it at the end of such stroke, and means to move the plunger yieldingly on its pressure stroke, including a spring to move the plunger and means to relieve the plunger from pressure from the spring before the plunger completes its pressure stroke.

11. A pressure-producing mechanism for a lubricating system, comprising a cylinder, a delivery pipe connected thereto, a reciprocable plunger therein, means to move the plunger positively on its non-pressure stroke and to release it at the end of such stroke, and means to move the plunger yieldingly on its pressure stroke, said last-named means including a helical spring larger in diameter than the diameter of the plunger, a movable member in contact with one end of the spring, and connections between the movable member and the plunger arranged to permit the plunger to be moved independently of the member.

SYLVANUS D. LOCKE.
CHARLES R. DOSCH.
HENRY J. STEGEMAN.